United States Patent [19]

Eustacchio et al.

[11] 4,456,530

[45] Jun. 26, 1984

[54] APPARATUS FOR IMPROVING GRAVITY DEHYDRATION IN STRAINER BELT PRESSES

[75] Inventors: Peter Eustacchio; Erwin Koren, both of Graz, Austria

[73] Assignee: Maschinenfabrik Andritz Aktiengesellschaft, Graz, Austria

[21] Appl. No.: 447,954

[22] Filed: Dec. 8, 1982

[30] Foreign Application Priority Data

Dec. 31, 1981 [AT] Austria ............................ 5660/81

[51] Int. Cl.³ ............................................. B01D 33/36
[52] U.S. Cl. .................................. 210/396; 210/400; 210/401
[58] Field of Search ............... 210/386, 396, 400, 401, 210/526, 531, 769, 780, 783; 209/264, 272, 307, 308, 385, 428, 507; 100/222

[56] References Cited

U.S. PATENT DOCUMENTS

| | | | |
|---|---|---|---|
| 702,956 | 6/1902 | Johnson | 209/507 |
| 1,207,452 | 12/1916 | Wall | 209/507 |
| 1,833,497 | 11/1931 | Prouty | 210/783 |
| 3,275,154 | 9/1966 | Fritz | 210/396 |
| 3,891,549 | 6/1975 | Carmel et al. | 210/386 |
| 3,980,559 | 9/1976 | Netzell | 210/783 |
| 4,062,780 | 12/1977 | Estabrook | 210/401 |
| 4,142,971 | 3/1979 | LeFur et al. | 210/386 |
| 4,153,550 | 5/1979 | Lautrette | 210/386 |
| 4,255,269 | 3/1981 | Timmer | 210/400 |
| 4,324,659 | 4/1982 | Titoff | 210/386 |
| 4,354,935 | 10/1982 | Austin | 210/400 |

*Primary Examiner*—Peter A. Hruskoci
*Assistant Examiner*—Wanda L. Millard
*Attorney, Agent, or Firm*—James E. Bryan

[57] ABSTRACT

This invention relates to an apparatus for restratifying the filter cake in the strainer zone of strainer belt presses, in particular double strainer sludge dehydrating equipment, comprising one or more monofilament or multifilament cables (9) tensioned transversely or obliquely to the direction of advance of the strainer across the width of the strainer belt (6) and the filter cake (7).

3 Claims, 6 Drawing Figures

APPARATUS FOR IMPROVING GRAVITY DEHYDRATION IN STRAINER BELT PRESSES

This invention relates to an apparatus for alternating the filter cake in the straining zone of strainer belt presses, in particular with reference to double strainer sludge dehydration equipment.

Gravity dehydration in a strainer belt press is used to separate the easily separating interstitial water between the solids. Preferably, the solid particles will be in the flocculent state when making contact, whereby they achieve some mechanical shear resistance. This is required so that the solids can withstand the shear forces generated during the ensuing wedging dehydration.

It is known to move the suspension in the material intake onto the strainer belt and to let the water issuing in the process drain down and to evacuate it by means of a collecting tank.

German Offenlegungsschrift No. 3,004,005 discloses dehydration equipment with a revolving strainer part designed as a mesh device which receives the batch of material and with wiper strips mounted below the sieve to wipe off the water issuing downwardly and adhering to the meshes of the sieve, which they guide into the collecting tank.

Such gravity dehydration has the drawback of the impedance to filtration offered by the filter cake. Small solid particles that have moved through the filtrate to the vicinity of or against the filtering means hamper the free removal of the filtrate in those locations.

The object of the present invention is to provide an apparatus for restratifying the filter cake in the straining zone of strainer belt presses wherein measures are taken to counter the filtration impedance and the interstitial water is eliminated to obtain an improved dehydration rate. This object is realized by the invention in that one or more mono- or multifilament cables are tensioned transversely or obliquely to the direction of motion of the strainer and across all of the entire path width and between the path of the strainer and the filter cake. To force a draining effect on the filter cake for purposes of dehydration, in a further design of the invention, a cross beam is arranged transversely to the strainer path and provided with spaced, rake-like bars touching the strainer path, with one cable being mounted to each bar if appropriate.

This step assures that the filter cake will be restratified in the straining zone and thereby a substantially higher efficiency in dehydration is obtained.

The invention will be further illustrated by reference to the accompanying drawings, in which.

Figure 1:
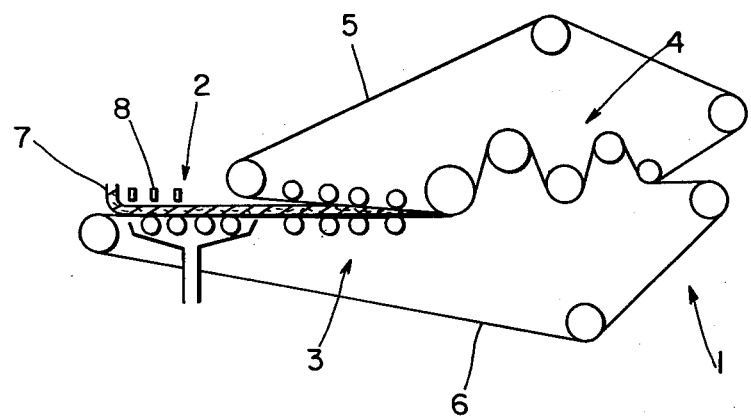
FIG. 1 is a schematic view of dehydrating equipment in accordance with the invention.

FIG. 1 is a side view of a double strainer belt dehydration apparatus in the form of a double belt press 1. It includes a strainer zone 2 adjoining the wedging zone 3 and terminating in the press zone 4. The upper strainer 5 passes over the upper rollers of the individual dehydration zones, and the lower strainer 6 acts similarly. The filter cake 7 is made to pass between the two strainer belts 5, 6. The front reversing roller is mounted offset sufficiently toward the front that a strainer zone 2 is obtained thereby before the two strainer belts 5, 6 gradually approach one another in the wedging zone 3. Cross beams 8 are mounted above the material intake in the strainer zone 2, being sequentially arrayed and discussed further below regarding their function. The press zone 4 includes an arrangement of rollers permitting one or more S-shaped reversals of the strainer belts 5, 6 together with the filter cake 7.

Figure 2:
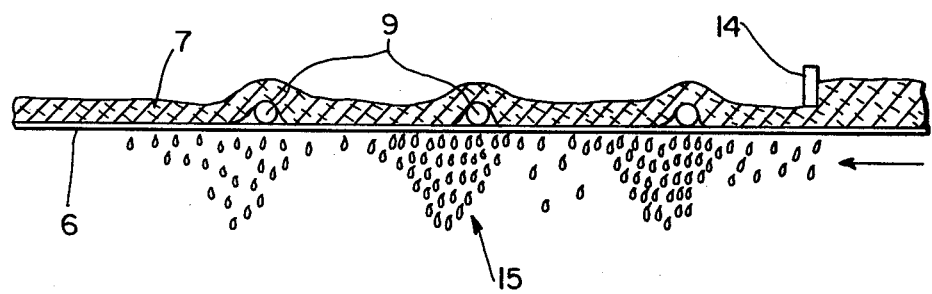
FIG. 2 shows the arrangement of the cables.

FIG. 2 is an enlarged cut-out of the strainer zone 2. One or more mono- or multi-filament cables 9 are tensioned transversely across the width of the path of the strainer belt 6 while resting on or being only slightly above the lower strainer 6. This tensioning however is not high, rather it is low. Preferably also a wiping blade 14 is mounted above the strainer belt 6 and in front of the cables 9 so that the filter cake does not exceed the desired height. As viewed in the direction of advance (indicated by the arrow), the filter cake 7 is moved forwardly on the strainer belt 6, the water dropping by gravity through the strainer belt. After the filter cake 7 has been moved over the cables tensioned transversely to the strainer belt, the blocking layer of the filter cake perforce has been destroyed and thereby a new pore structure has been formed in the cake. As a result, and as confirmed by experiment, a higher dehydration rate is achieved. This fact is symbolically shown in the Figure by the filtrate droplets 15.

Figure 3:
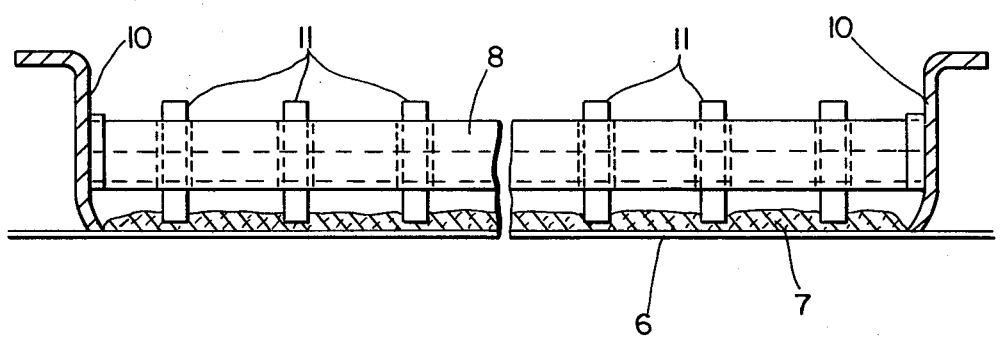
FIG. 3 shows the arrangement of the cross beams with bars.

FIG. 3 shows a cross-section of the strainer belt 6 supporting the filter cake 7 which is guided thereon. A format limiter 10 is provided on each side of the strainer belt 6, the shape being indicated in the Figure. The cross beam 8 is mounted above the conventional filter cake height and is secured to the side of the riser of the format limiter 10. The securing sites of the cables 9 are also at the same location, as shown in FIG. 1. A number of displaceable guide bars 11 are mounted approximately uniformly spaced across the width of the strainer path. These bars 11 are intended to form longitudinal furrows in the filter cake 7. The displaceable suspension of the bars 11 is for the purpose of permitting these bars to constantly rest on the strainer path. This furrow formation in the filter cake provides an additional draining effect as water is thereby allowed to collect so it can pass through the only slightly clogged bases of the furrows and hence through the strainer belt 6.

Figure 4:
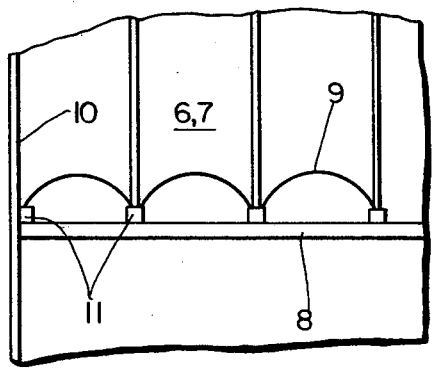
FIG. 4 is a top view of the strainer belt and the filter cake.

FIG. 4 is a top view of the strainer belt 6 and the filter cake 7. The format limiter 10 is indicated at the sides. The cross beam 8 and the bars 11 are mounted transversely above the belts. Each bar 11 holds the cables 9 in a loose manner so that each cable segment forms a loop. This provides the advantage that, in addition to forming furrows, the filter cake also is turned over by means of the cables 9.

Figure 5:
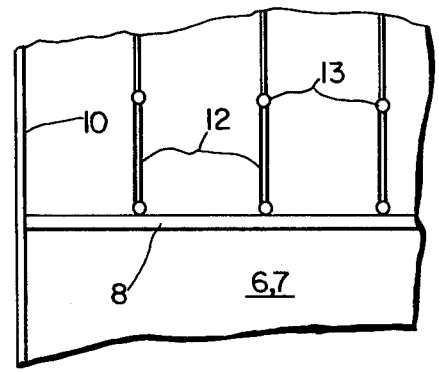
FIG. 5 is a top view of the cross beams with drag cables.
Figure 6:
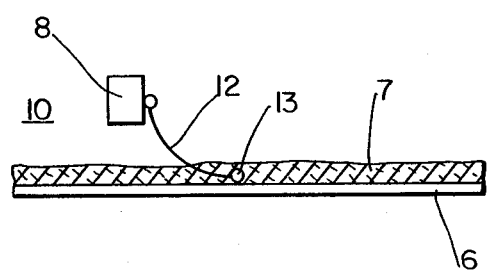
FIG. 6 is a side view, in section, of the cross beams with drag cables.

Lastly FIGS. 5 and 6 show the arrangement of drag cables 12. FIG. 5 is a top view of the strainer belt 6 and filter cake 7 with the cross beam 8 being mounted fixed to the format limiter 10, however in lieu of the bars 11, only drag cables 12 are employed, which hang down and partly slide on the strainer belt 6. To prevent the drag cables 12 from floating on the filter cake, small weights 13 are furthermore mounted to the ends of the drag cables 12.

FIG. 6 shows the cross beam 8 in cross-section in that plane where the drag cables 12 are connected. They extend as far as the strainer belt 6 and form furrows in the filter cake 7, this effect being enhanced by the weights 13 at the ends of the cables.

What is essential is that restratification of the filter cake 7 lying on the strainer belt 6 be performed by means of the cables 9 and/or the bars 11. This assures a substantial increase in the dehydration rate.

It will be obvious to those skilled in the art that many modifications may be made within the scope of the present invention without departing from the spirit thereof, and the invention includes all such modifications.

What we claim is:

1. An apparatus for restratifying the filter cake in the strainer zone of strainer belt presses, in particular double strainer sludge dehydrating equipment, comprising at least one monofilament or multifilament cable means (9) tensioned transversely or obliquely to the direction of advance of the strainer across the width of the strainer belt (6) and the filter cake (7), and including cross beam means (8) mounted over the width of the strainer belt, said cross beam means being equipped with spaced, vertical, displaceable bars (11), and said cable means connected to each of said bars (11) in the form of a loop contacting said strainer belt to restratify said filter cake.

2. An apparatus for restratifying the filter cake in the strainer zone of strainer belt presses, in particular double strainer sludge dehydrating equipment, comprising at least one monofilament or multifilament cable means (9) tensioned transversely or obliquely to the direction of advance of the strainer across the width of the strainer belt (6) and the filter cake (7), and including cross beam means (8) mounted over the width of the strainer belt, said cross beam means being equipped with spaced, vertical, displaceable bars (11), and said cable means connected to each of said bars (11) in the form of a loop contacting said strainer belt to restratify said filter cake, and at least drag cable means (12) mounted to the cross beam means (8) capable of sliding on said strainer belt to form furrows in said filter cake.

3. An apparatus for restratifying the filter cake in the strainer zone of strainer belt presses, in particular double strainer sludge dehydrating equipment, comprising at least one monofilament or multifilament cable means (9) tensioned transversely or obliquely to the direction of advance of the strainer across the width of the strainer belt (6) and the filter cake (7), and including cross beam means (8) mounted over the width of the strainer belt, said cross beam means being equipped with spaced, vertical, displaceable bars (11), and said cable means connected to each of said bars (11) in the form of a loop contacting said strainer belt to restratify said filter cake, and at least one drag cable means (12) mounted to the cross beam means (8) capable of sliding on said strainer belt to form furrows in said filter cake and including weights (13) mounted to the ends of said drag cables (12) to prevent the drag cables from floating on the filter cake.

* * * * *